United States Patent [19]

Eisenberg et al.

[11] Patent Number: 5,097,751
[45] Date of Patent: Mar. 24, 1992

[54] DEVICE FOR SUPPORTING THE MECHANICAL AND ELECTRICAL CONTROL MEMBERS OF A TOASTER AN TOASTER COMPRISING SUCH A DEVICE

[75] Inventors: Roger Eisenberg, Marly; Jean-Marie Balandier; Alain Didierlaurent, both of Vagney; Alain Rousseau, Le Syndicat, all of France

[73] Assignee: SEB S.A., Selongey, France

[21] Appl. No.: 582,964

[22] PCT Filed: Jan. 26, 1990

[86] PCT No.: PCT/FR90/00057

§ 371 Date: Nov. 26, 1990

§ 102(e) Date: Nov. 26, 1990

[87] PCT Pub. No.: WO90/08496

PCT Pub. Date: Aug. 9, 1990

[30] Foreign Application Priority Data

Feb. 1, 1989 [FR] France .................. 89 01270
Feb. 1, 1989 [FR] France .................. 89 01273
Feb. 1, 1989 [FR] France .................. 89 01274
Feb. 1, 1989 [FR] France .................. 89 01275
Feb. 1, 1989 [FR] France .................. 89 01276

[51] Int. Cl.[5] ............................ A47J 37/08
[52] U.S. Cl. .................. 99/327; 99/329 R; 99/329 RT; 99/385; 99/389; 219/492; 219/514
[58] Field of Search ............. 99/327, 328, 329 R, 99/329 P, 329 RT, 334, 335, 385, 389, 391, 393; 337/113, 38; 219/510, 492, 521, 385, 514

[56] References Cited

U.S. PATENT DOCUMENTS

| | | |
|---|---|---|
| 2,288,748 | 7/1942 | Scharf . |
| 2,520,873 | 8/1950 | Bean . |
| 2,560,389 | 7/1951 | Olving .................. 99/329 R |
| 2,692,929 | 10/1954 | Ericson . |
| 2,954,451 | 9/1960 | Freeman . |
| 3,175,482 | 3/1965 | Olson . |
| 3,253,535 | 5/1966 | chivers . |
| 3,342,121 | 9/1967 | Pavelka, Jr. et al. ............. 99/329 R |
| 3,361,053 | 1/1968 | Jepson et al. .......................... 99/391 |
| 3,438,318 | 4/1969 | Williams .............................. 99/391 |
| 3,587,907 | 6/1971 | Okuda et al. ........................ 99/385 |
| 3,669,004 | 6/1972 | Eaton, Jr. et al. ................... 99/331 |
| 3,866,525 | 2/1975 | Oxel ..................................... 99/385 |
| 3,956,978 | 5/1976 | Borley ................................. 219/514 |
| 4,136,607 | 1/1979 | Mitsuo et al. ........................ 99/337 |
| 4,345,513 | 8/1982 | Holt ..................................... 99/391 |
| 4,402,258 | 9/1983 | Guarnerio . |
| 4,889,042 | 12/1989 | Hantz et al. ......................... 99/390 |

FOREIGN PATENT DOCUMENTS

| | | |
|---|---|---|
| 1515109 | 6/1969 | Fed. Rep. of Germany . |
| 1515110 | 6/1969 | Fed. Rep. of Germany . |
| 2139672 | 3/1973 | Fed. Rep. of Germany .... 99/329 R |
| 1562530 | 4/1969 | France . |
| 2353258 | 12/1977 | France . |
| 379084 | 8/1964 | Switzerland . |
| 499302 | 1/1971 | Switzerland . |
| 721321 | 1/1955 | United Kingdom . |
| 734301 | 7/1955 | United Kingdom . |

*Primary Examiner*—Timothy F. Simone
*Attorney, Agent, or Firm*—Young & Thompson

[57] ABSTRACT

The device is intended to support the mechanical and electrical members of a toaster (1).

The device consists of a plate (2) in plastic material comprising protuberances or tongues (3, 4, 5, 6) molded in the plastic material and projecting on one of the faces of the plate (2), these protuberances or tongues being shaped in order to receive and to ensure the fixing of conducting (7, 8) or mechanical elements by translation of the latter perpendicularly to the plate (2), these elements being intended to form the mechanical and electrical control members of the toaster.

Application particularly in vertical toasters.

26 Claims, 6 Drawing Sheets

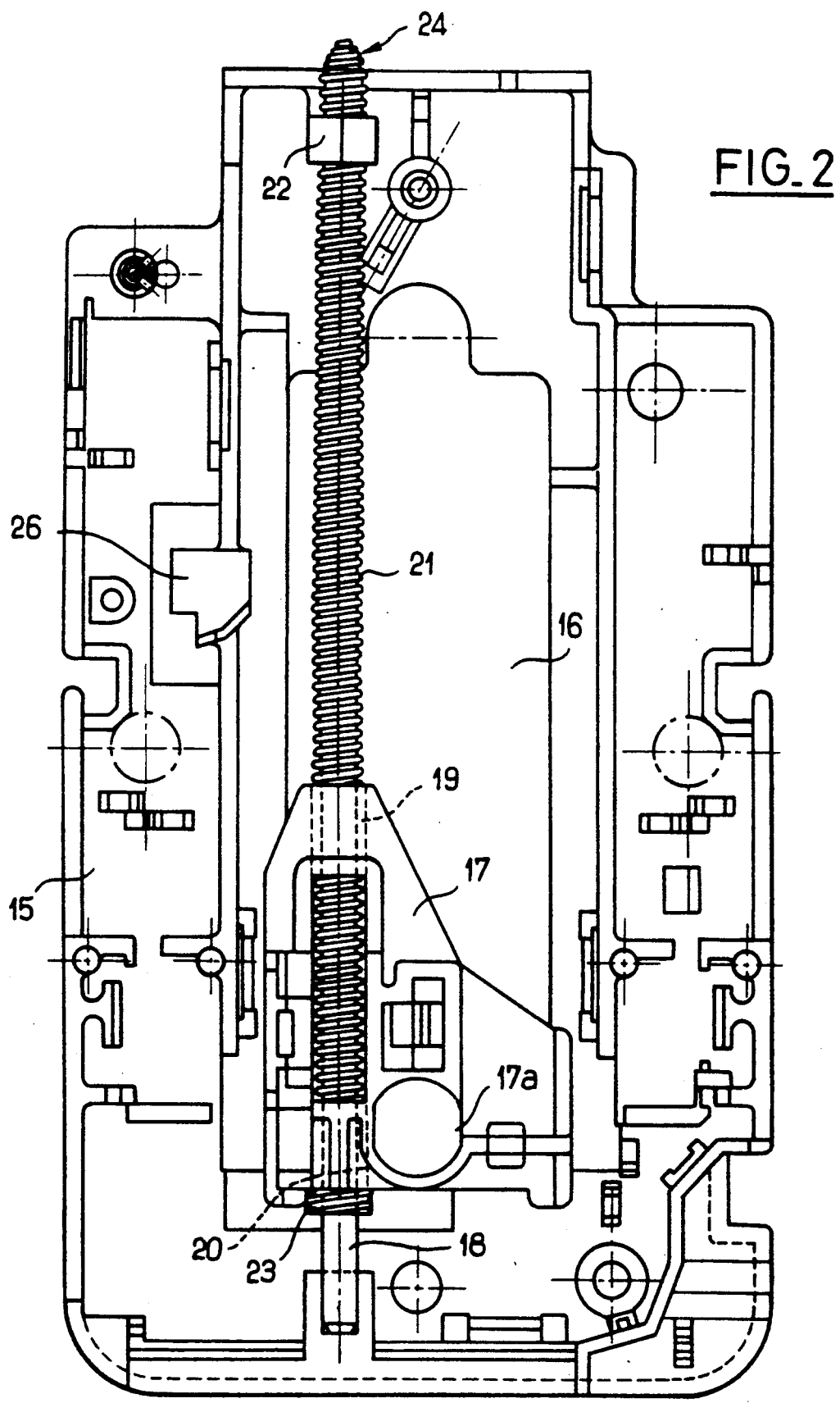
FIG_2

FIG_5

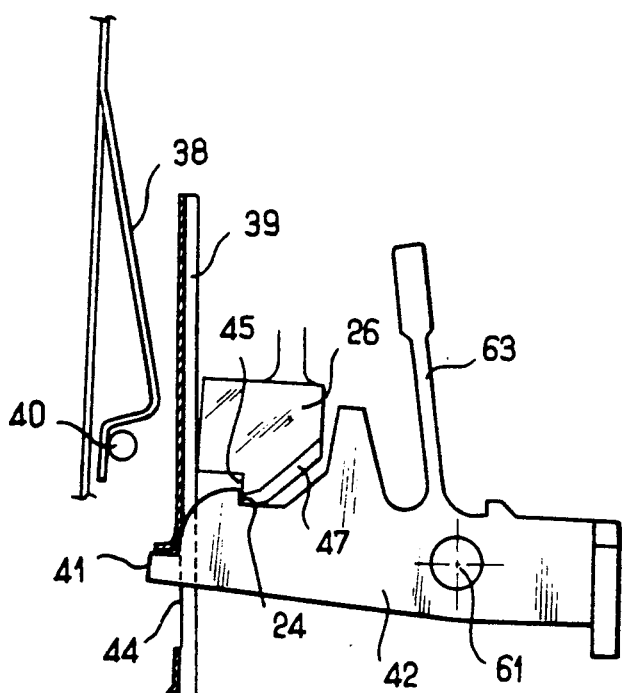
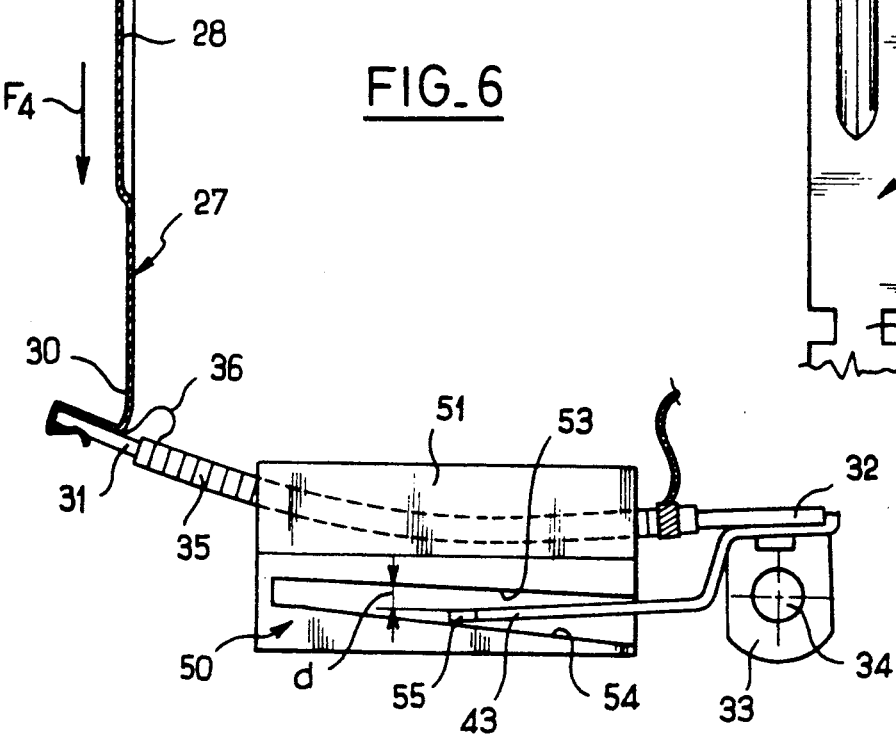
FIG. 6
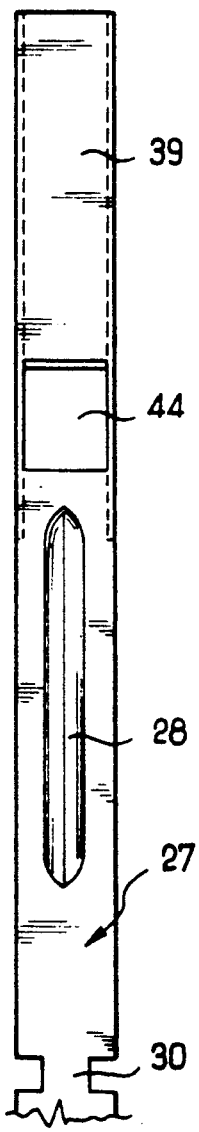
FIG. 7

DEVICE FOR SUPPORTING THE MECHANICAL AND ELECTRICAL CONTROL MEMBERS OF A TOASTER AN TOASTER COMPRISING SUCH A DEVICE

FIELD OF THE INVENTION

The present invention relates to a device for supporting the mechanical and electrical members of an electrical appliance, particularly a toaster.

The invention also relates to various improvements made to said mechanical and electrical members.

DESCRIPTION OF RELATED ART

Known toasters generally comprise three main parts inside the control box which are distinguished in the following manner:

a metallic support which serves as a rigid base to which the electrical members and the mechanism are attached;

the electrical members (timer, switch, power-supply cable attachment) consisting of insulating and metallic components;

the electrical connections consisting of insulated flexible conductors which connect the electrical members with the aid of connections generally produced with clips and tongues.

This construction gives rise to a large number of components which can be fitted only by manual operations; in particular, the flexible cabling and the snap connections. Moreover, each electrical member must be efficiently insulated from the toaster housing. Furthermore, all the electrical and mechanical members must be adjusted after having been fixed to the toaster.

Therefore, current toaster designs are complicated and costly.

SUMMARY OF THE INVENTION

The present invention aims to remedy the drawbacks of known embodiments by creating a device for supporting the mechanical and electrical members, which permits both a reduction in production and fitting costs and an increase in reliability.

The invention thus relates to a device which can be fitted to a toaster of the vertical type, comprising a housing containing a support for supporting the slices of bread and at least one heating resistor, means being provided for commanding the displacement of the support for the slices of bread, means for locking said support in a low position, means for electrical power supply to the heating resistor, means for adjusting the heating temperature of said resistor and means for cutting-off this electrical power supply after a certain period of heating.

According to the invention, said device comprises a plate in electrically insulating material on which the abovementioned means are fixed, this plate forming an insulating support for all the electrical members of said means, said means being preadjusted and said plate comprising means for fixing it to one of the faces of said housing.

This plate makes it possible to fit thereon, in the factory, all the mechanical and electrical control members or means of the toaster.

The fact that the plate forms an insulating support for all the electrical members dispenses with the need to provide individual electrical insulation for each member, which increases their cost.

Moreover, all these members are preadjusted on the plate before the latter is fixed to the housing of the toaster, which is much more convenient.

According to an advantageous version of the invention, the plate is in plastic material and comprises protuberances or tongues molded in the plastic material and projecting on one of the faces of the plate, these protuberances or tongues being shaped in order to receive and ensure the fixing of conducting or mechanical elements by translation of the latter perpendicularly to the plate.

This plate makes it directly possible to receive the bare electrical members by virtue of the insulating nature of the material and of the provision of forms possible in molding. The electrical connections may be produced with cut-out metal strips which may be fitted in an automatic manner due to the dimensional stability of these components. The positioning of a contact on these strips and the provision of form thereof makes it possible to embody the switch function without any other attached component and without connection.

Moreover, this plate ensures the positioning and the guiding of the mechanism (for example that controlling the slide of a toaster) in a simple manner; the provision of tongues in the plastic material permits economic assemblies by means of snapping, without attached components of the screw or rivet type.

Moreover, the casing for the components is produced such that these components can be fitted simply by means of a single vertical descent movement which may be automated. The form of the casings may be easily produced by molding.

The device according to the invention thus corresponds to the objectives of a reduction in assembly cost and of an increase in reliability due to the reduction in the number of components and their fitting which can be automated.

According to an advantageous version of the invention, the protuberances or tongues of the plate in plastic material comprise bearing surfaces or slots for receiving or encasing said conducting or mechanical elements.

According to a preferred version of the invention, the tongues or protuberances have bearing surfaces or slots capable of ensuring the fixing of elements in the form of metallic strips by encasing, snapping or pinching of the latter, after translation of these strips perpendicularly to the outer face of the plate.

The device to which the invention relates also comprises a slide intended to support the slices of bread in a toaster, which comprises means for guiding the sliding of the slide between two positions and a spring for returning the slide towards one of these positions.

According to the invention, the abovementioned guiding means comprise a rod engaged in one or more cylindrical apertures made in the slide and having a diameter corresponding to that of the spring, this return spring being fitted around a rod and engaged in the cylindrical aperture or apertures, this spring being fitted over one of the ends of the rod, the opposite end of the spring being shaped so that it bears against the adjacent aperture of the slide.

Given that the axes of the spring and of the rod are coincident, no spurious force transverse to the axis of the rod is generated, such that the risks of wear and friction are avoided.

The device according to the invention also comprises a device for cutting-off the electrical power supply of the heating resistor, comprising a bimetallic strip connected to a conducting strip connected to the flexible electrical resistor in a zone located close to the bimetallic strip and whose end opposite the latter bears elastically on a conducting member connected to the electrical power supply, it being possible for this end to slide over this member under the effect of the deformation of the bimetallic strip, means being provided for separating the strip from said conducting member after a predetermined sliding path of this strip over the abovementioned member.

According to an advantageous version of the invention, the means for separating the strip comprise a recess made in the latter and a member bearing on the strip against said conducting member and being able to engage in said recess after said predetermined sliding path, such that the strip can flex by means of elastic return towards the member engaged in the recess and thus separate from the conducting member.

The device according to the invention comprises, moreover, means for adjusting the functioning of the bimetallic strip associated with an electrical heating resistor ensuring the curving of this bimetallic strip, one of the ends of this bimetallic strip interacting with electrical and mechanical members in order to command the cutting-off of the electrical power supply of said resistor and in order to release said mechanical members.

This device is defined in that one of the ends of the bimetallic strip is fitted pivotably on a fixed shaft and carries a member engaged in a slot made in a body fitted slidably in the direction of the length of the bimetallic strip, this slot extending substantially in this direction and delimiting an upper ramp on which said member bears when the bimetallic strip is at rest and a lower ramp on which said member bears when the bimetallic strip reaches a certain stage of curving, these ramps forming different and predetermined slopes relative to the bimetallic strip.

According to an advantageous version of the invention, the slope of the lower ramp is determined in order to adjust, by sliding of the body, the duration of the maintenance of the electrical power supply ensuring the heating of the resistor and the slope of the upper ramp is determined in order to modify the distance between the two ramps and to adjust the release point of the mechanical members upon cooling of the resistor.

Thus, a certain distance between the two ramps and, consequently, an adjustment of the release point, that is to say the rise of the slide of the toaster, corresponds to each adjustment of the duration of the maintenance of the electrical power supply ensuring the heating of the resistor.

The device according to the invention also comprises mechanical means for locking and unlocking the breadholder slide fitted slidably vertically in the toaster, this device ensuring the locking of the slide in a low position and the rise of the latter being ensured by a return spring.

According to the invention, these means comprise an upper connecting rod articulated to a lower connecting rod, the end of the upper connecting rod opposite the common articulation being articulated at a fixed point and the end of the lower connecting rod opposite the common articulation being articulated to the slide, an intermediate lever extending transversely to the upper connecting rod being articulated to the latter against the action of a spring, the end of this lever comprising a nose which is capable of hooking to a fixed retention notch when the slide is displaced in a lower position, this locking being maintained by the force exerted towards the top of the return spring of the slide and means being provided for applying a traction to the end of the intermediate lever in order to cause the latter to pivot and to unlock the nose from the notch in order to permit the rise of the slide.

Thus, it suffices to apply a slight vertical traction to the end of the abovementioned intermediate lever in order to command the rise of the slide.

Other features and advantages of the invention will become further apparent from the following description.

BRIEF DESCRIPTION OF THE DRAWINGS

In the appended drawings, given by way of nonlimiting examples:

FIG. 2 is a plan view of a plate of a toaster supporting the sliding slide intended to raise the slices of bread, FIG. 6 is a view similar to FIG. 5, showing the action of the bimetallic strip on the strip controlling the release of the rise mechanism of the slide, FIG. 7 is a plan view of the control strip.

DESCRIPTION OF THE PREFERRED EMBODIMENTS

Figure 1:
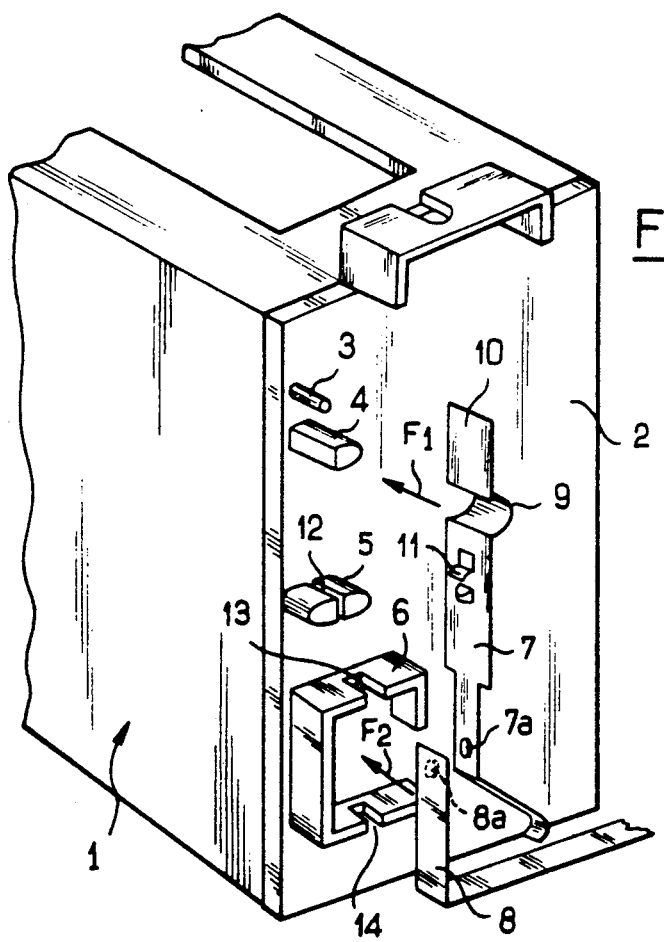
FIG. 1 is a partial perspective view of a toaster equipped with a lateral plate intended to support electrical connections.

In the embodiment of FIG. 1, the toaster 1 comprises on one of its lateral end faces a plate 2 molded in plastic material and the dimensions of which correspond substantially to those of said lateral face.

This plate 2 in electrically insulating plastic material serves both as a mechanical and electrical support.

In the example shown, the plate 2 has, on its outer face, a certain number of tongues or protuberances 3, 4, 5, 6 molded at the same time as the plate and intended to receive and to directly position (without additional insulation or fixing component) metallic connection and contact strips such as 7, 8. These strips, 7, 8 serve to command the operation of the toaster by means of a timing device which is not shown in FIG. 1.

The tongues or protuberances 3, 4, 5, 6 made on the plate 2 are shaped in order to be able to be demolded by extraction in a direction perpendicular to the plate 2.

Similarly, these tongues or protuberances, 3, 4, 5, 6 are shaped in order to receive and position the strips, 7, 8 by means of a simple movement of the latter perpendicularly to the plate 2 (see arrow $F_1$ and $F_2$). This movement may be made very simply by a robot or a manipulator arm.

Thus, the strip 7 has a part 9 folded into a U which presses against a complementary surface of the protuberance 4, while the end 10 of this strip 7 bears against the tongue 3 located above the protuberance 4.

The strip 7 comprises, under the U-part 9, two elastic tongues 11 which snap over the straight part of the protuberance 5 which is separated from the lefthand part of the latter by a slot 12 which receives the actual strip 7. This strip 7 also engages in the upper slot 13 made in the protuberance 6 in the form of a rectangular cup. The lower slot 14 of this protuberance 6 receives the strip 8.

The strips 7 and 8 have, facing one another, contacts 7a, 8a capable of establishing an electrical contact between these two strips when they are stressed towards one another.

The tongues and protuberances 3, 4, 5, 6 ensure an extremely precise positioning of the strips 7, 8 relative to one another, which ensures excellent reliability while permitting easy molding without additional components such as screws or the like.

Of course, the plate 2 may comprise other protuberances or recesses which are easily moldable and capable of receiving other members or accessories whose positioning may also be performed by robot.

In the embodiment of FIG. 2, the plate 15, which is provided on one of the end faces of the toaster, has a central recess 16.

A slide 17 sliding vertically upwards and downwards is fitted in this recess 16. This slide 17 can be maneuvered by a gripping member, which is not shown, fixed in the opening 17a.

In FIG. 2, the slide 17 is in a low position. This slide 17 supports a horizontal arm (not shown) which supports the slices of bread to be toasted.

The slide 17 is guided in its vertical sliding movement by a vertical rod 18 which is engaged in cylindrical apertures, 19, 20 made in the top and in the bottom of the slide 17. These apertures 19, 20 have a diameter which is markedly greater than that of the rod 18, corresponding in fact to the diameter of the helical spring 21 fitted on the rod 18. This spring 21 extends over virtually the entire height of the plate 15. Its upper end 24 is conical and is fitted on the upper part of the rod 18, whereas its lower end has an enlarged diameter 23 which abuts against the periphery of the lower aperture 20 of the slide 17.

In the position shown in FIG. 2, the slide 17 is in a low position and the spring 21 is stretched. The slide 17 is locked in this position by means of a member which is not shown in FIG. 2. When this member is unlocked, the slide 17 is returned upwards by the spring 21, which simultaneously raises the slices of bread.

When the slide 17 is displaced, the spring 21, in addition to its return function, also serves as a sliding bearing surface. Given that the stresses are exerted precisely in the axis of the rod 18, the slide 17 is not subjected to any couple tending to cause friction and wear of the bearing surfaces of the slide.

Moreover, given that the spring 21 is coaxial with the rod 18, the structure of the assembly is very compact.

Figure 3:
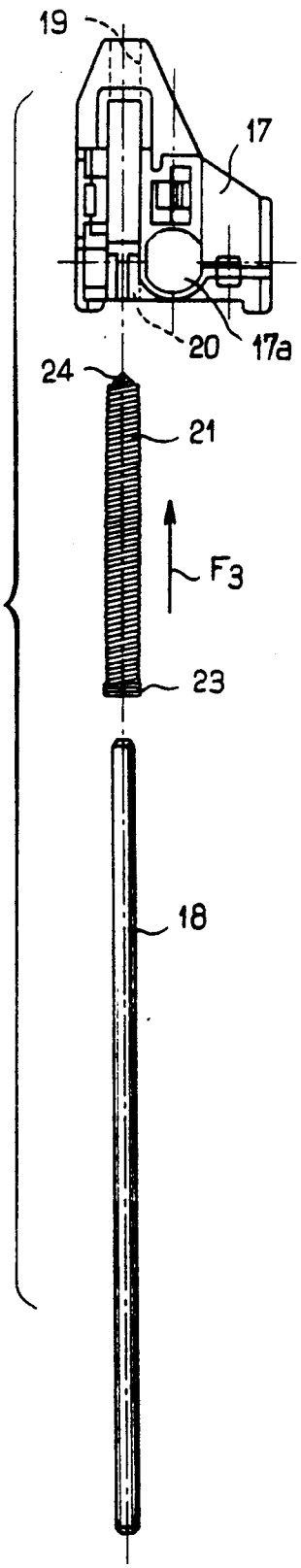
FIG. 3 is an exploded plan view showing the slide, its return spring and its guiding rod.

FIG. 3 illustrates the fitting of the rod 18, spring 21 and slide 17 assembly.

Firstly, the spring 21 is fitted in the apertures 20 and 19 of the slide 17 in the direction of the arrow $F_3$. This introduction is facilitated by the fact that the upper end 24 of the spring 21 is conical.

The enlarged rear part 23 of the spring 21 makes it possible for it to stop under the aperture 20 of the slide 17.

It then suffices to engage the rod 18 in the spring 21 in place in the slide.

Figure 4:
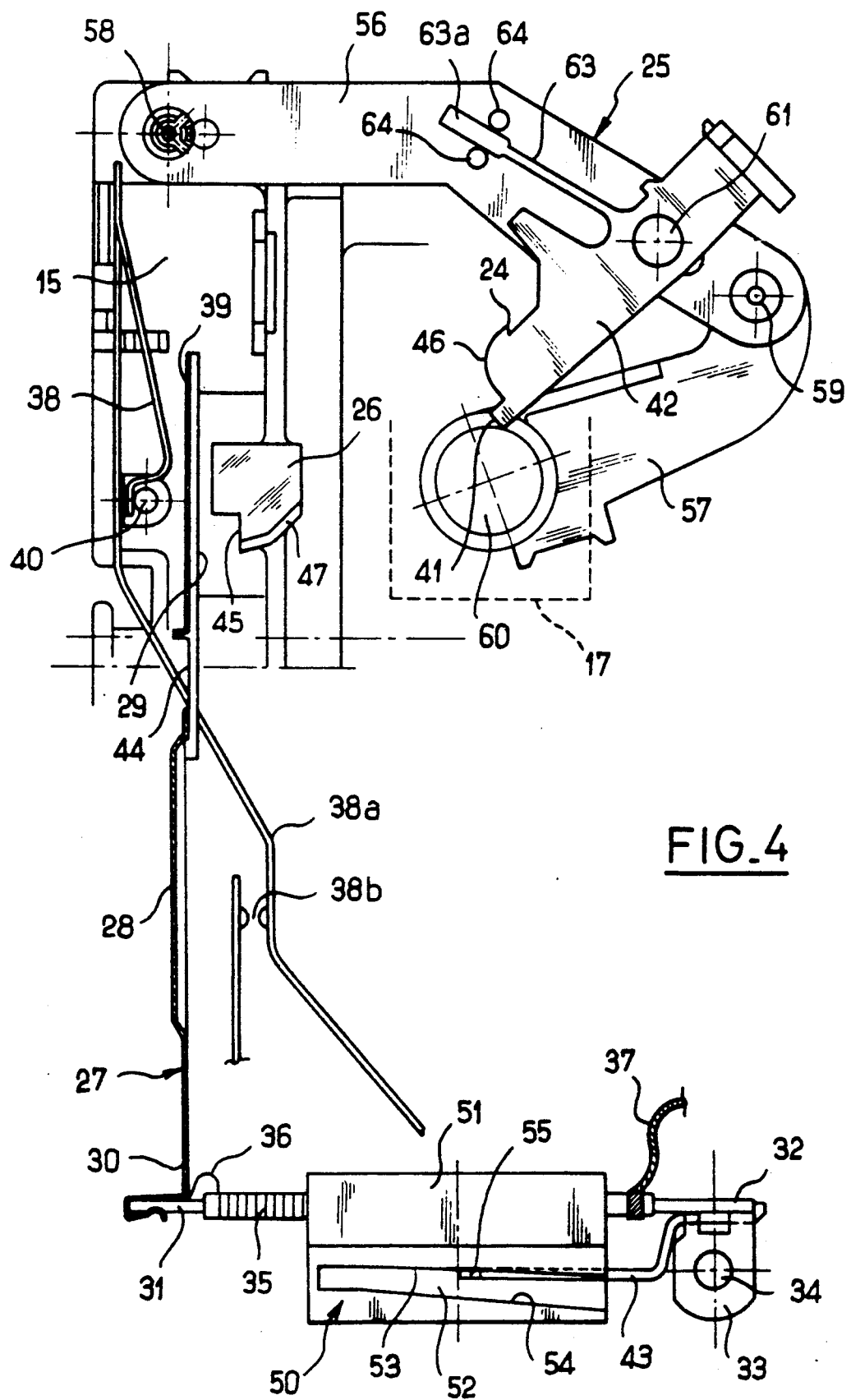
FIG. 4 is a plan view of the mechanical and electrical control device of the slide, the latter being in a high position.
Figure 5:
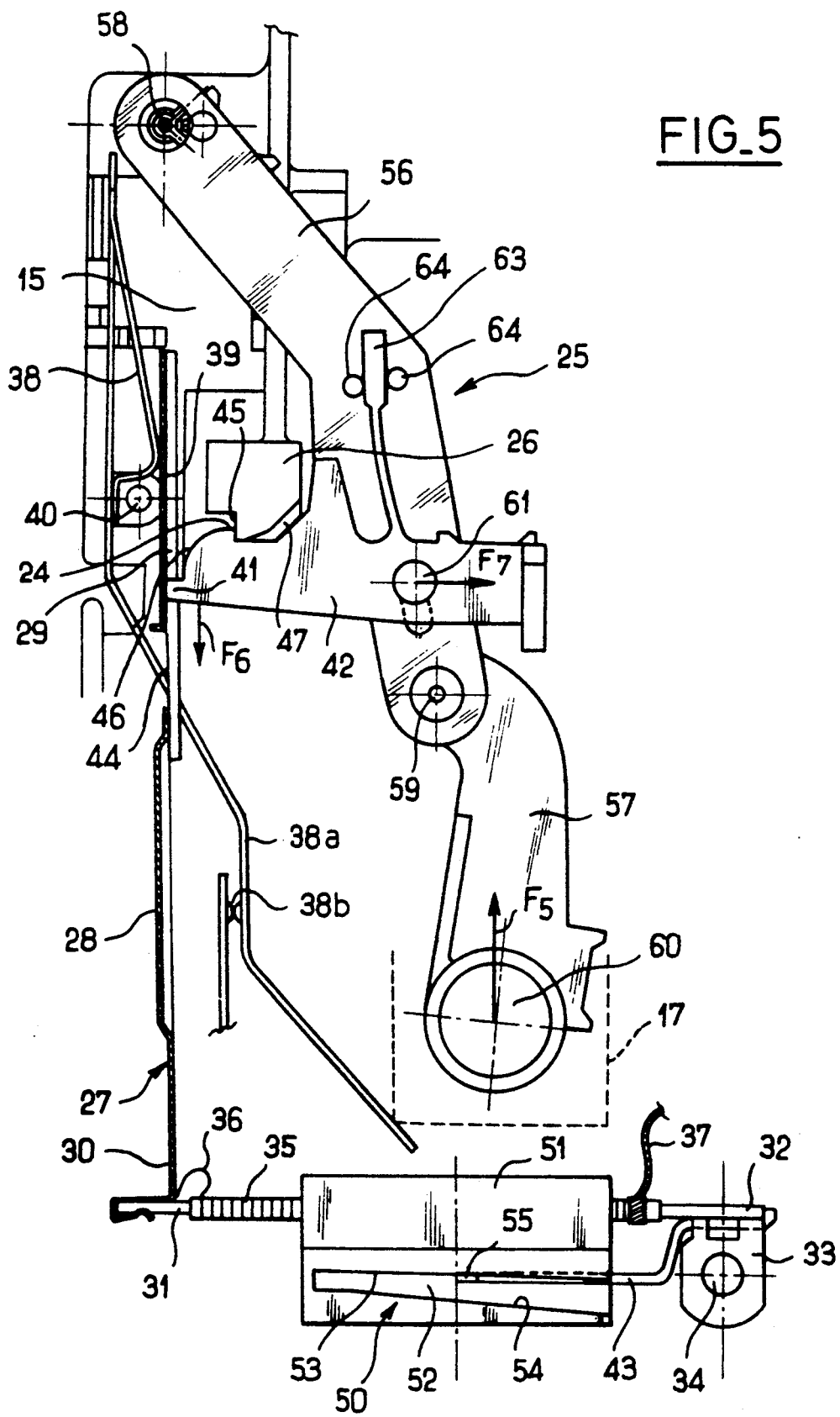
FIG. 5 is a view similar to FIG. 4, the slide being in a low position.

In the embodiment in FIGS. 4 and 5, the system for commanding the displacement of the slide 17 (shown in dotted lines) has been shown. The known principles will firstly be recalled. In the rest position, shown in FIG. 4, the slide 17 is in a high position. When the user wishes to toast slices of bread, he places the slide 17 in a low position. In the present embodiment and as indicated in FIG. 5, the spring 21 (see FIG. 2), associated with the slide 17, is stretched and this slide is locked by virtue of the nose 24, carried by a mechanism 25 integral with the slide 17, in engagement with a stop member 26 integral with the plate 15 (see also FIG. 2). The mechanism 25 will be described in detail hereinbelow.

A description will now be given of the device which makes it possible to command the unlocking of the slide 17 when the slices of bread are sufficiently toasted.

Figure 8:
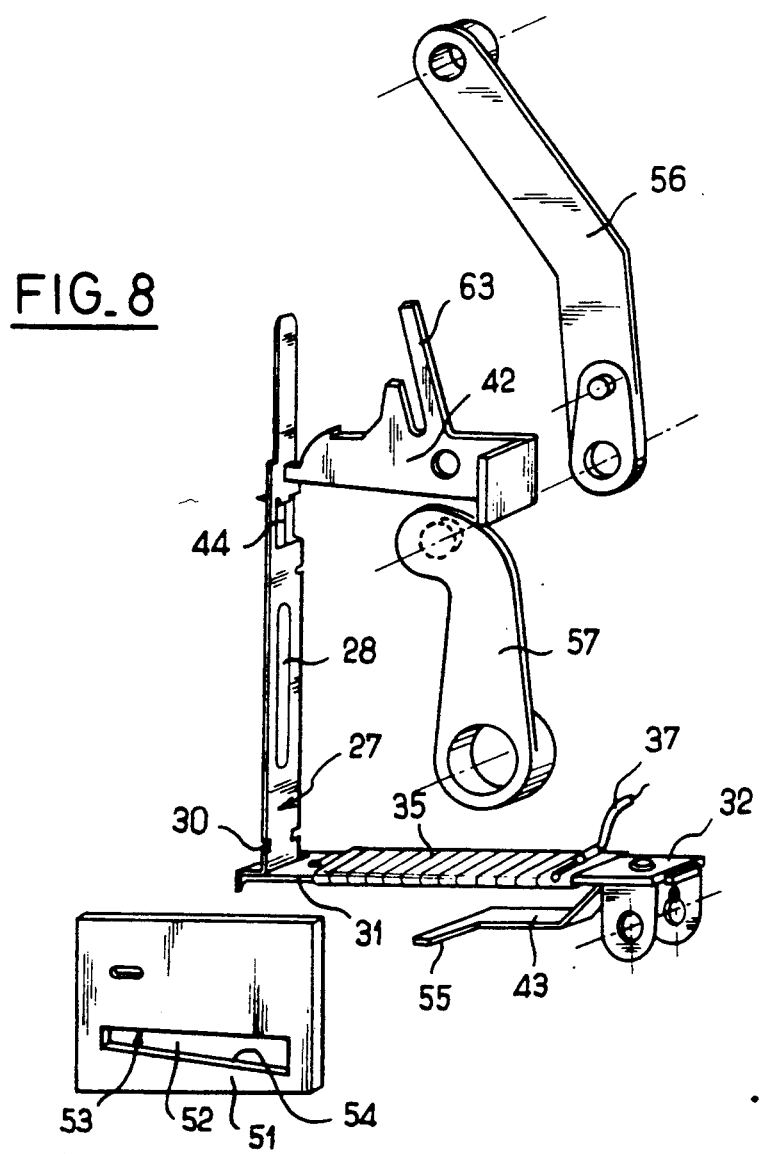
FIG. 8 is an exploded perspective view of the mechanical and electrical control device of the slide.

This device comprises a metallic strip 27 extending vertically and stiffened over virtually its entire length by virtue of a die-cast rib 28 (see particularly FIGS. 7 and 8) extended by an upper U-section part 39. The lower end 30 of the strip 27 is narrowed so as to localize the flexing of this strip at this level.

The lower end of the strip 27 is made integral with a bimetallic strip 31 extending substantially perpendicularly to the strip 27.

The end 32 of the bimetallic strip 31 comprises a lug 33 articulated on a shaft 34 integral with the plate 15.

An electrical heating resistor 35, connected electrically between a bare conducting wire 36 in contact with the strip 27 and an insulated conducting wire 37, is wound around the bimetallic strip 31.

The heating resistor 35 is switched on and off by interaction between a thin elastic connection plate 38 and the upper part 39 of the strip 27.

The displacement of the thin plate 38 towards the abovementioned part 39 is limited by a fixed stop 40.

In the position shown in FIG. 4, the upper part 39 of the strip 27 is separated from the thin plate 38 and the slide 17 is in a high position. The heating resistor 35 is not supplied with power.

In the position shown in FIG. 5, the slide 17 is in a low position and a stud 41 made on the end of the arm 42 of the mechanism 25 bears on the strip 27 and keeps the end 39 of the latter in contact with the thin plate 38.

Moreover, the slide 17 bears on a connection bar 38a connected to the thin plate 38, thus closing an electrical switch 38b ensuring the electrical power supply of the connection bar 38a.

The heating resistor 35 is thus supplied with electrical current.

This heating resistor 35 then heats up the bimetallic strip 31. The latter curves and causes the rise of the strip 27 (see FIG. 6), it being understood that a member 43, which will be described hereinafter, limits the pivoting of the bimetallic strip 31 about the shaft 34.

During the rise of the strip 27, the part 39 of the latter slides over the thin elastic plate 38 and the electrical power supply of the resistor 35 is maintained until the stud 41 of the arm 42 penetrates into a window 44 made in the strip 27 (see also FIG. 7).

Due to this engagement, the strip 27 flexes elastically towards the arm 42 and the part 39 of the strip separates from the thin plate 38 and bears against the stop 26. The heating resistor 35 is then switched off.

The electrical power supply of the resistor 35 being cut off, the bimetallic strip 31 tends to reassume its rest position. During this displacement, the strip 27 is pulled in the direction of the arrow F₄. Given that the stud 41 of the arm 42 is retained in the window 44 of the strip, this stud 41 is pulled downwards which causes the pivoting of the arm 42, the release of the nose 24 from the retention notch 45 of the stop 26, the release of the stud 41 from the window 44 and the rise of the slide 17 through the action of the return spring 21.

In order to reset the toaster in an operating position, it suffices to lower the slide 17 manually as far as the position indicated in FIG. 5, in which the nose 24 of the arm 42 hooks on the retention notch 45 of the stop 26. This method of locking is facilitated by the fact that the end of the arm 42 comprises, between the stud 41 and the nose 24, a curved surface 46 which can slide over an inclined ramp 47 made on the stop 26 upstream of the retention notch 47.

When this resetting in an operating position is effected shortly after the automatic rise of the slide 17, the bimetallic strip 31 has not returned to ambient temperature and has therefore not entirely reassumed its rest position.

In this case, the distance existing between the window 44 and the stud 41 of the arm 42 is smaller than in the case where the bimetallic strip 31 has entirely reassumed its initial position and form.

Thus, after switching on the heating resistor of the bimetallic strip 31, the latter will very rapidly reassume the position shown in FIG. 6, in which the stud 41 engages in the window 44 and whereafter the resistor 35 is switched off and the slide 17 rises. In this case, the slices of bread carried by the slide 17 have been insufficiently exposed to the radiation of the resistors located in the toaster and are therefore insufficiently toasted.

In order to remedy this drawback, the invention provides a compensation system 50 which will now be described.

The term "compensation" defines the time which the appliance must automatically deduce from the adjustment of the toaster, after a first operation, in order to obtain the same level of toasting of the bread during the second operation and during N number of subsequent operations. In fact, when starting from cold, the toasting time is, for example, for medium toasting (mark 3), 160". After 20" of stoppage (removal of the toasted bread and reloading), the toaster is switched on again. The operating time must then be 120" in order to obtain the same toasting of the bread. The compensation is thus, in this case, 25%.

This compensation is obtained by construction. The cooling of the bimetallic strip and thus its straightening is a reflection of the cooling of the casing of the toaster (heating bars, reflectors, grill, framework and the like).

For an ideal thermal system, the temperature rise curves and the cooling curves are repetitive.

Figure 9:
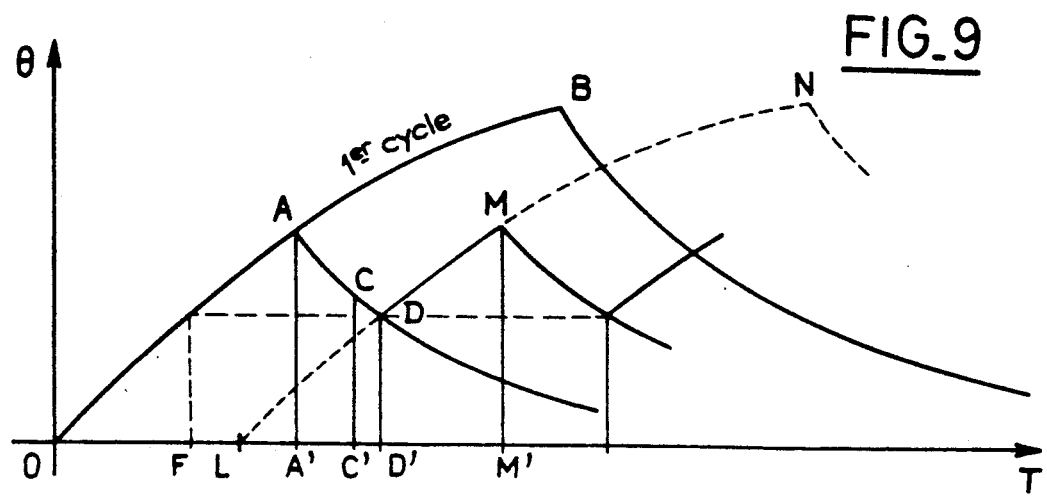
FIG. 9 is an operational diagram.

These curves are illustrated in FIG. 9, which shows, as ordinates, the temperature θ, and, as abscissae, the time T.

In this figure, the letters used denote respectively:
OAB first temperature rise curve (adjustment mark: 6)
A cutting-off of the heater 31 (and of the heating bars) for the adjustment mark: 1
OA' time of first heating, for the adjustment mark 1
AC cooling of the heater
C rise of the slide (end of cycle)
D reloading
C'D' time required for unloading/reloading
OF represents the thermal compensation LMN temperature rise curve, the section DM of which is used during the Nth switching-on.

In fact, the simple cooling is supplemented by a hysteresis phenomenon of the bimetallic strip peculiar to the material and to the thicknesses of its components, to the molecular bonding between the latter and to other reasons. This hysteresis is all the greater when the temperature of the bimetallic strip is higher. It is added to the compensation time due to the reactuation temperature.

The system 50 comprises a member 51 located opposite the bimetallic strip 31 and fitted slidably in horizontal slideways which are not shown. The member 51 comprises a slot 52 extending substantially in the direction of the bimetallic strip 31 and under the latter. This slot 52 delimits an upper ramp 53 and a lower ramp 54.

An arm 43 made integral with the end 32 of the bimetallic strip adjacent to the articulated lug 33 is engaged in this slot 52. The end of this arm 43 carries a spur 55 which bears either on the upper ramp 53 when the bimetallic strip 32 is at rest (see FIGS. 4 and 5), or on the lower ramp 54 when the bimetallic strip is curved (see FIG. 6).

Thus, at the start of the heating of the resistor 35, the curving of the bimetallic strip 31 gives rise to no upward displacement of the strip 27 since, during this period, the bimetallic strip 31 curves displacing the spur 55 of the arm 43 of the upper ramp 53 towards the lower ramp 54 by pivoting about the shaft 34. Thus, it is only when the spur 55 bears on the lower ramp 54 that the subsequent curving of the bimetallic strip 31 gives rise to an upward displacement of the strip 27.

Consequently, the distance d (see FIG. 6) between the spur 55 and the upper ramp 53 determines the period during which the curving of the bimetallic strip 31 produces no displacement of the strip 27.

The result of this is thus that when the bimetallic strip 31 is cold, that is to say not curved (see FIGS. 4 and 5), the period during which the slide 17 is in a low position (and during which the slices of bread are exposed to the radiation of the resistors) is equal to the period required to displace the spur 55 over the distance d, plus that required to displace the strip 27 until the stud 41 engages in the window 44.

On the other hand, when, after a first use, the slide 17 is reset in a low position and the bimetallic strip 31 is still warm and curved, such that the spur 55 bears on the lower ramp 54, the abovementioned period is reduced to that required to displace the strip 27.

Bearing in mind the slope of the ramps 53 and 54, the abovementioned distance d varies as a function of the position of the spur 55 relative to these ramps. This distance d may be adjusted by displacing the block 51 towards the right or towards the left, which has the effect of adjusting the toasting time of the slices of bread.

The lower ramp 54 makes it possible to adjust the inclination of the bimetallic strip 31 and thus to determine the time that the heater 35 and the heating bars of the toaster re switched on. The upper ramp 53 whose slope is less than that of the ramp 54 makes it possible to modify the cycle stop point on the cooling curve, which acts on the compensation by modifying the re-start temperature in the following cycle. It has a slope such that, for a long-period adjustment, the spur 55 cannot rise as high as for a short period.

Briefly, the ramp 54 makes it possible to adjust the heating time while the counter-ramp 53 makes it possible to modify the cut-off point in the cooling curve.

Another important feature of the invention lies in the structure of the mechanism 25 associated with the slide 17.

This is a knuckle-joint mechanism. This mechanism is composed of two articulated connecting rods 56 and 57 parallel to the plate 15 (see FIGS. 4, 5 and 8).

The upper connecting rod 56 has its end articulated at 58 to the plate. Its opposite end is connected by an articulation 59 to the lower connecting rod 57 which is itself connected by an articulation 60 to the slide 17. As already indicated hereinabove, this slide 17 can slide vertically, its displacement being guided by the rod 18 (see FIG. 2).

The intermediate lever 42 extends transversely to the upper connecting rod 56 and it is connected to the latter by a pivot 61. The rotation of the lever 42 is limited by a spring arm 63 transverse to the latter extending in the direction of the connecting rod 56 and the end 63a of which is guided between two projections 64 integral with the lever 56. As already described hereinabove, the end of the intermediate lever 42 has a curved surface 46 at the rear of which a hooking nose 24, capable of locking in a retention notch 45 made on a stop 26, is made, as indicated in FIG. 5.

In the position indicated in FIG. 5, the force $F_5$ exerted by the spring of the slide 17 tends to bring the latter upwards. The articulation point 59 of the connecting rods 56 and 57 being located beyond the line joining the end articulations 58 and 60, this force $F_5$ gives rise to a resultant horizontal force $F_7$ (see FIG. 5) which, brought to the level of the intermediate lever 42, tends to press the notch 45 against the nose 24.

The nose 24 is unlocked from the notch 45 by pulling the end of the lever 42 downwards (see arrow $F_6$ in FIG. 5).

Through the action of this force $F_6$, the lever 42 pivots slightly about 61 against the return action exerted by the spring arm 63.

The force required to cause the lever 42 to pivot is of the order of 60 and 100 g. As already explained hereinabove, this force is created during the cooling of the bimetallic strip 31 which generates a traction towards the bottom of the strip 27.

After pivoting of the lever 42, the mechanism 25 assumes the position shown in FIG. 4. In order to relock the slide 17 in a low position, it suffices to pull the latter downwards by means of the handle provided for this purpose, which automatically brings the end of the lever 42 opposite the stop 26. By continuing the movement, the curved part 46 of the end of the lever 42 slides over the ramp 47 of the stop, which gives rise to an elastic deformation of the spring arm 63 and, at the end of the path, the nose 24 hooks onto the retention notch 45.

Of course, the invention is not limited to the illustrative embodiments which have just been described and numerous modifications may be made thereto without departing from the scope of the invention. Inter alia, the lever 42 may equally be fitted pivotably on the connecting rod 57 or directly on the shaft 59 common to the two connecting rods. This lever may also be dispensed with and replaced by a device for retaining the shaft 59, such as a magnet or an electromagnet.

What is claimed is:

1. A device adapted to be fitted to a toaster including a housing (1) containing a support (17) for supporting slices of bread and at least one heating resistor, said device comprising: means (31) being provided for commanding the displacement of the support for the slices of bread, means (25) for locking said support in a low position, means for electrical power supply to the heating resistor, means for adjusting the heating temperature of said resistor, means for cutting-off this electrical power supply after a certain period of heating, wherein said device comprises a plate (2) in electrically insulating material on which all of said means are fixed, said plate forming an insulating support for all the electrical members of said means, said means being preadjusted on said plate before fixing the plate to the housing, and said plate (2) comprising means for fixing it to one of the sides of said housing (1).

2. The device as claimed in claim 1, wherein the plate (2) is made out of a plastic material and comprises protuberances or tongues (3, 4, 5, 6) molded in the plastic material and projecting on one of the faces of the plate (2), said protuberances or tongues being shaped in order to receive and ensure the fixing of conducting (7, 8) or mechanical elements by translation of the latter perpendicularly to the plate (2).

3. The device as claimed in claim 2, wherein said protuberances or tongues (3, 4, 5, 6) comprise bearing surfaces or slots (12, 13, 14) for receiving or encasing said conducting (7, 8) or mechanical elements.

4. The device as claimed in claim 2, wherein said elements consist of cut-out metallic strips (7, 8).

5. The device as claimed in claim 4, wherein the tongues or protuberances (3, 4, 5, 6) have bearing surfaces or slots capable of ensuring the fixing of said strips (7, 8) by encasing, snapping or pinching of the latter, after translation of these strips perpendicularly to an outer face of the plate (2).

6. The device as claimed in claim 4, which comprises at least two metallic strips (7, 8) fixed facing one another so as to form an electrical switch.

7. The device as claimed in claim 1, comprising a slide (17) intended to support the slices of bread, said device including means for guiding the sliding of the slide (17) between two positions and a spring (21) for returning the slide towards one of these positions, wherein the guiding means comprise a rod (18) engaged in one or more cylindrical apertures (19, 20) made in the slide (17) and wherein the return spring (21) is fitted around the rod (18) and engaged in the cylindrical aperture or apertures (19, 20).

8. The device as claimed in claim 7, wherein said spring (21) has an upper end and said upper end is shaped in order to fit over the upper part of the rod (18).

9. The device as claimed in claim 7, wherein said spring has a lower end (23) and said lower end is shaped so that it bears against an adjacent aperture (20) of the slide (17).

10. The device as claimed in claim 9 wherein said lower end of the spring (21) comprises a widening (23).

11. The device as claimed in claim 10, wherein the upper end (24) of the spring (21) opposite the widening (23) is conical.

12. The device as claimed in claim 1, wherein said means for cutting-off the electrical power supply of the heating resistor, comprise a bimetallic strip (31) associated with an electrical heating resistor (35) fitted in order to permit a deformation of said bimetallic strip (31) under the effect of the heat created by said resistor (35), said bimetallic strip interacting with an electrical switch (38, 39) for cutting-off the electrical power supply of this resistor (35) at a certain stage of the deformation of this bimetallic strip (31), wherein the bimetallic strip (31) is connected to a conducting strip (27) connected at one end to the electrical resistor (35) and at the opposite end (39) bears elastically on a conducting member (38) connected to the electrical power supply, thereby allowing opposite end (39) to slide over this conducting member (38) under the effect of the deformation of the bimetallic strip (31), means being provided for separating the strip (39) from said conducting member (38) after a predetermined sliding path of said strip over said conducting member.

13. The device as claimed in claim 12, wherein said means for separating the strip (39) comprise a recess (44) in said strip and a member (41) bearing on the strip (39) against said conducting member (38) and being able to engage in said recess (44) after said predetermined sliding path, such that the strip (39) can flex by means of elastic return towards the member (41) engaged in the recess (44) and thus separate from the conducting member (38).

14. The device as claimed in claim 12, further comprising means for automatically commanding the rise of the slide (17) supporting the slices of bread.

15. The device as claimed in claim 14, wherein said member (41) capable of engaging in the recess (44) of the strip (27) forms part of the means (25) for commanding the rise of the slide (17), said member (41) being arranged in order to command this rise when a specific traction is exerted thereon.

16. The device as claimed in claim 15, wherein the engagement of said member (41) in the recess (44) of the strip (27) is arranged in order to ensure a locking, such that the inverse deformation undergone by the bimetallic strip (31) during its cooling creates a traction on the strip (27) as well as on the member (41) locked thereto.

17. The device as claimed in claim 12, wherein said conducting strip (27) is rigid over the greater part of its length and has a narrowing (30) at its end connected to the bimetallic strip (31) enabling said strip to be flexible in this zone.

18. The device as claimed in claim 13, wherein said recess (44) is a window made in the strip (27).

19. The device as claimed in claim 1, comprising means (50) for adjusting the functioning of a bimetallic strip (31) associated with an electrical heating resistor (35) ensuring the curving of this bimetallic strip, one of the ends of this bimetallic strip interacting with electrical (38, 39) and mechanical (25) members for commanding the cutting-off of the electrical power supply of said resistor and for releasing said mechanical members, wherein the other end (32) of the bimetallic strip (31) is pivotably fitted on a fixed shaft (34) and carries a member (43) engaged in a slot (52) made in a body (51) fitted slidably in the direction of the length of the bimetallic strip (31), said slot (52) extending substantially in this direction and delimiting an upper ramp (53) on which said member (43) bears when the bimetallic strip (31) is or returns to being at rest and a lower ramp (54) on which said member (43) bears when the bimetallic strip (31) reaches a certain stage of curving, said ramps (53, 54) forming different and predetermined slopes relative to the bimetallic strip (31).

20. The device as claimed in claim 19, wherein the slope of the lower ramp (54) is determined for adjusting by sliding of the body (51), the duration of the maintenance of the electrical power supply ensuring the heating of the resistor (35).

21. The device as claimed in claim 20, wherein the slope of the upper ramp (53) is determined for adjusting the release point of the mechanical members upon cooling of the resistor (35).

22. The device as claimed in claim 1, comprising mechanical means (25) for locking and unlocking a bread-holder slide (17) fitted slidably vertically in the toaster, said mechanical means (25) ensuring the locking of the slide (17) in a low position and a return spring for ensuring the rise of said slide, and wherein said mechanical means comprise an upper connecting rod (56) articulated to a lower connecting rod (57), the end of the upper connecting rod (56) opposite the common articulation (59) being articulated at a fixed point (58) and the end of the lower connecting rod (57) opposite the common articulation (59) being articulated to the slide (17) and wherein a retention means interacts with one or the other connecting rod (56, 57) or with their shaft (59) of articulation for holding the slide (17) momentarily in said low position.

23. The device as claimed in claim 22, wherein said retention means comprise an intermediate lever (42) extending transversely to the upper connecting rod (56) and articulated to the latter against the action of a spring (63), an end of said lever (42) comprising a nose (24) which is capable of hooking to a fixed retention notch (45) when the slide (17) is displaced in a low position, said locking being maintained by the force exerted towards the top of the return spring of the slide (17), means (27, 44) being provided for applying a traction ($F_6$) to the end of the intermediate lever (42) for causing the lever to pivot and to unlock the nose (24) from the notch (45) thereby allowing the rise of the slide (17).

24. The device as claimed in claim 22, wherein, in a locking position, the straight line connecting the fixed articulation (58) of the upper connecting rod (56) and the articulation (60) of the lower connecting rod (57) to the slide (17) is located slightly beyond the common articulation (59) of the two connecting rods, the return force ($F_5$) of the spring of the slide (17) being exerted in a vertical plane extending beyond said common articulation (59).

25. The device as claimed in claim 23, wherein said means for applying a traction on the end of the lever (42) comprise a strip (27) connected to a bimetallic strip (31) capable of curving under the effect of heat, said strip (27) and end of the lever comprising complementary locking means (44, 41) and said bimetallic strip (31) being capable of producing sufficient traction on the strip (27) to cause the lever (42) to pivot and to unlock.

26. A toaster comprising a device as claimed in claim 1.

* * * * *